United States Patent [19]

Nagashima

[11] Patent Number: 4,999,717

[45] Date of Patent: Mar. 12, 1991

[54] IMAGE READING APPARATUS

[75] Inventor: Nao Nagashima, Yokohama, Japan

[73] Assignee: Canon Kabushiki Kaisha, Tokyo, Japan

[21] Appl. No.: 273,478

[22] Filed: Nov. 21, 1988

[30] Foreign Application Priority Data

Nov. 28, 1987 [JP] Japan .................. 62-301012

[51] Int. Cl.$^5$ .............................. H04N 1/04
[52] U.S. Cl. ................... 358/448; 358/474; 358/213.11
[58] Field of Search ............. 358/256, 285, 286, 293, 358/76, 75, 401, 404, 213.11, 474, 482, 483, 488, 448, 452, 80

[56] References Cited

U.S. PATENT DOCUMENTS

| | | | |
|---|---|---|---|
| 4,558,357 | 12/1985 | Nakagawa | 358/75 |
| 4,691,114 | 9/1987 | Hasegawa | 358/482 |
| 4,750,048 | 6/1988 | Satoh | 358/287 |
| 4,870,500 | 9/1989 | Nagashima | 358/443 |
| 4,891,690 | 1/1990 | Hasegawa et al. | 358/75 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image reading apparatus provided with plural line sensors each having plural photosensitive elements and having mutually different image reading positions. The image reading positions of said plural line sensors is moved, and output image data of at least one of said plural line sensors is delayed in accordance with the difference in the image reading positions of said plural line. Further, the amount of data to be delayed is limited.

8 Claims, 7 Drawing Sheets

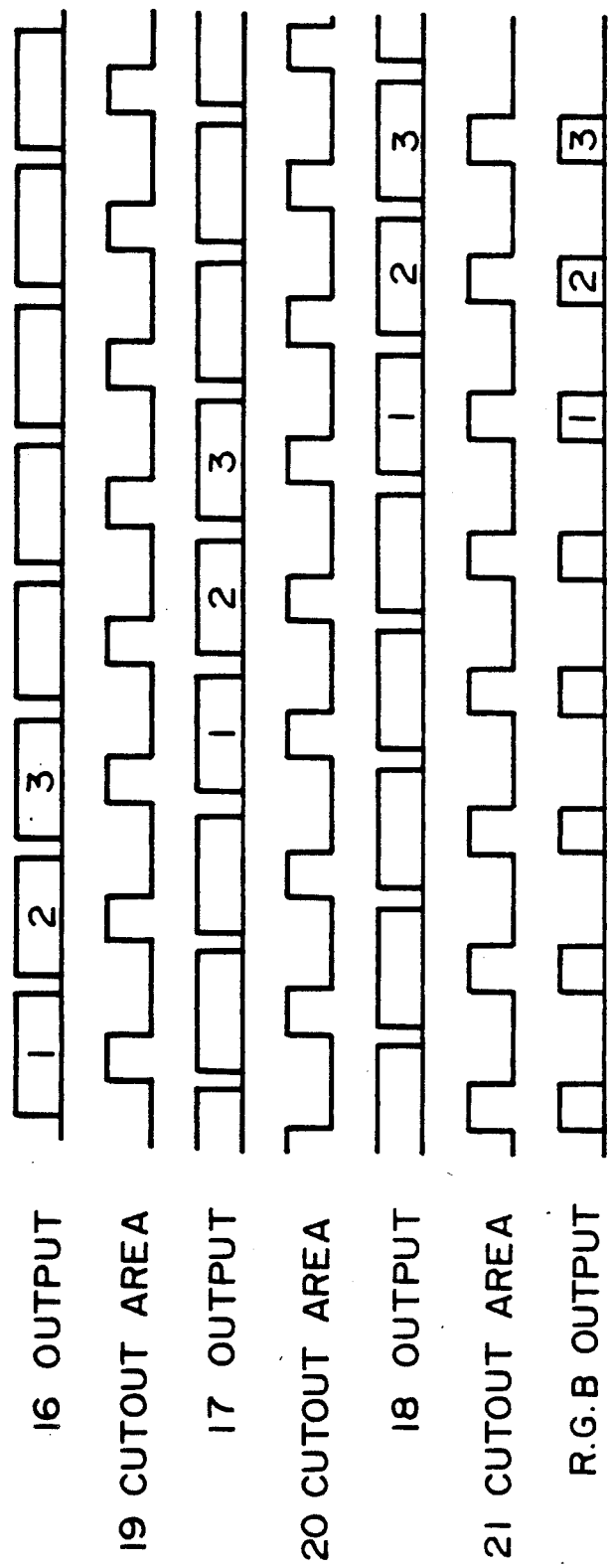

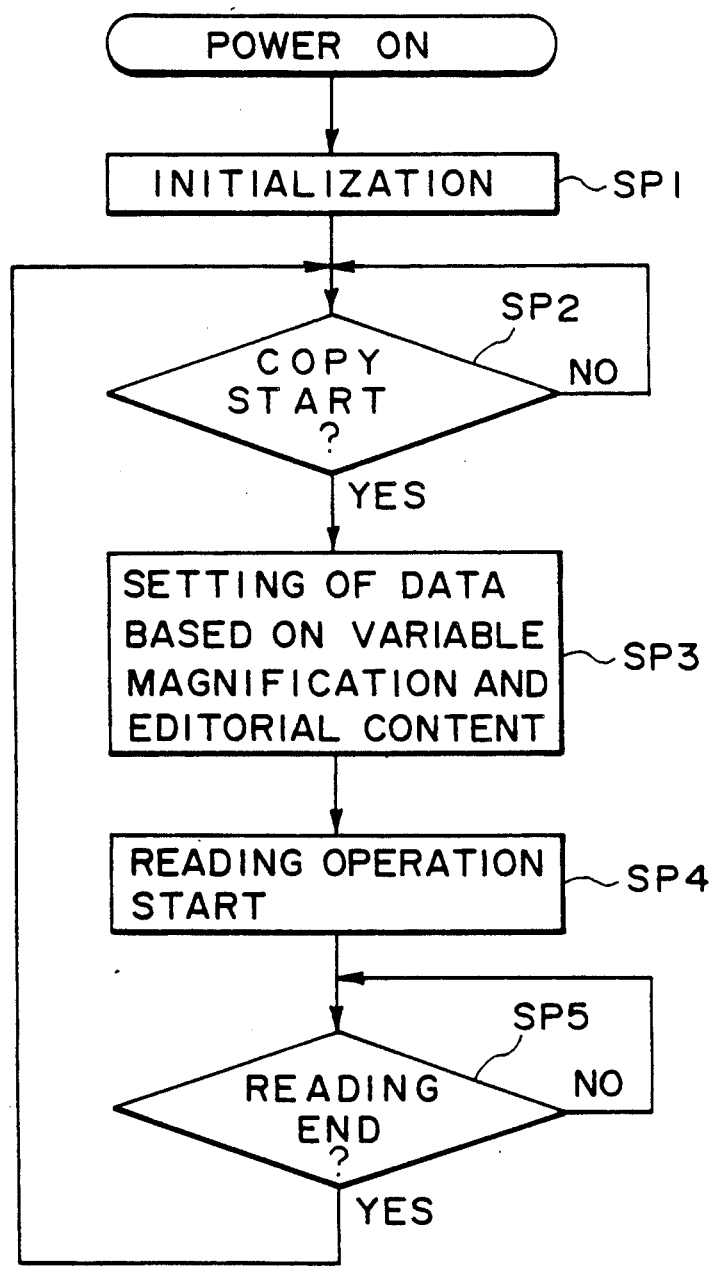
F I G. 5

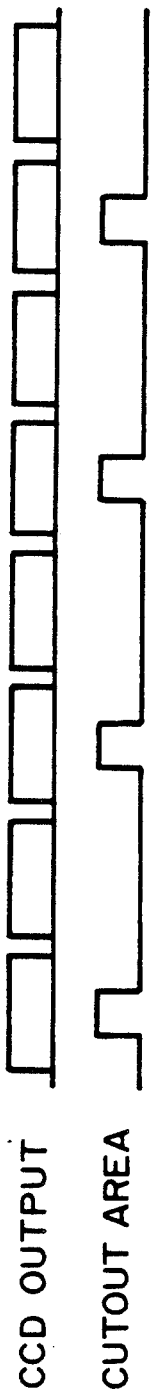
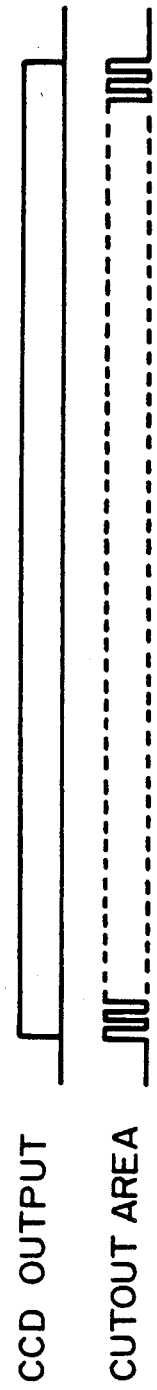
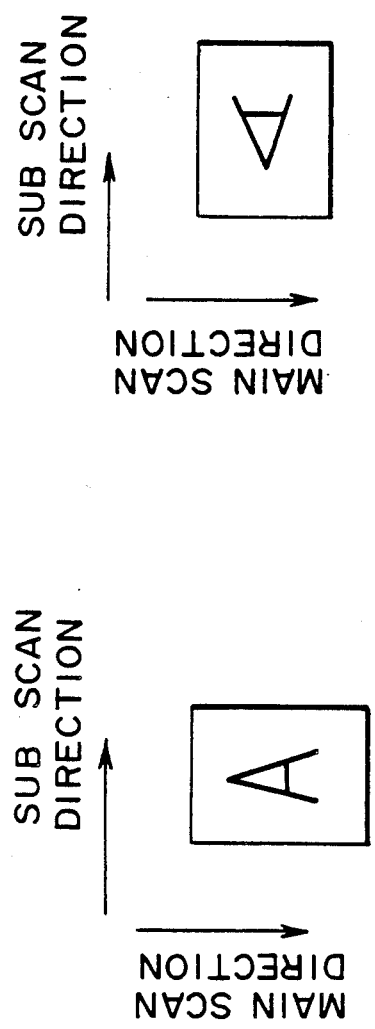
FIG. 6
FIG. 7
FIG. 8A
FIG. 8B

IMAGE READING APPARATUS

BACKGROUND OF THE INVENTION

1. Field of the Invention

The present invention relates to an image reading apparatus for reading the image of an original document by means of line image sensors such as CCD's, and more particularly to a color image reading apparatus for reading a color image with plural line image sensors of different colors arranged in the subscanning direction.

2. Related Background Art

In recent years there have been actively developed various color image reading apparatuses utilizing solid-state pickup components such as CCD's.

In such a color image reading apparatus, there is generally employed a line image sensor with different color filters arranged in the main scanning direction as disclosed by the assignee of the subject application in U.S. Pat. No. 4,891,690, or an arrangement of plural line image sensors of different color outputs in the sub scanning direction as disclosed by the assignee of the subject application in U.S. Pat. No. 4,558,357.

The former structure is advantageous in the simplicity of the structure, but is associated with drawbacks such that a stronger light source is required because the light-receiving area is limited, and such that a compensation is required for the aberration in the read image since the color filters are arranged along the main scanning direction.

On the other hand, the latter structure is associated with a drawback such that a complex circuitry involving memories is required for synchronizing different color signals in order to compensate the positional aberration among the plural line image sensors positioned along the sub scanning direction, but is free from the drawbacks inherent to the former structure.

The number of pixels in the line image sensor has been increasing in order to meet the requirement of image reading with a high image quality, and the former structure is disadvantageous in terms of device production, since each sensor requires a tripled number of pixels (in case of three-color reading) in comparison with the latter structure. Consequently, in order to meet the requirement of image reading with a high image quality, there is required a simple and inexpensive circuit for compensating the positional aberration, in the sub scanning direction, among the line image sensors of the latter structure.

For achieving an enlarged image reading, there is already known a method of reducing the relative moving speed between the line image sensors and the image in comparison with the case of equal-size image reading, thereby increasing the density of the image reading lines. When such enlarged image reading is applied to the above-mentioned latter structure, the number of lines between the neighboring line image sensors increases according to the rate of image enlargement.

Consequently the memory capacity, required for compensating the positional aberration of the line image sensors in the sub scanning direction, increases by the rate of image enlargement, in comparison with that required in the same size image reading. The decrease in said memory capacity is an essential condition for the above-mentioned simple and inexpensive circuit for correcting the positional aberration in the sub scanning direction.

SUMMARY OF THE INVENTION

An object of the present invention is to provide an image reading apparatus capable of image reading with high image quality and with a simple structure.

Another object of the present invention is to provide an image reading apparatus with plural line image sensors arranged in the sub scanning direction, capable of efficiently compensating the positional aberration among said plural line image sensor in the sub scanning direction.

Still another object of the present invention is to provide an image reading apparatus capable of satisfactorily reading a color image with a high resolving power.

Still another object of the present invention is to provide an image reading apparatus capable of reading a color image with an arbitrary image magnification or an arbitrary line density.

The foregoing and still other objects of the present invention, and the advantages thereof, will become fully apparent from the following description.

BRIEF DESCRIPTION OF THE DRAWINGS

FIG. 3 is a timing chart of the circuit shown in FIG. 1;

FIG. 5 is a flow chart showing an example of the control sequence.

FIG. 6 is a timing chart showing an example of pixel cutout in case of image reading with a doubled line density;

FIG. 7 is a timing chart showing an example of pixel cutout in a reduced image reading; and FIGS. 8A and 8B are schematic views showing the mode of placing the original image in case the image magnification in the main scanning direction is independent from that in the sub scanning direction.

DETAILED DESCRIPTION OF THE PREFERRED EMBODIMENTS

Now the present invention will be clarified in detail by embodiments thereof shown in the attached drawings.

Figure 2:
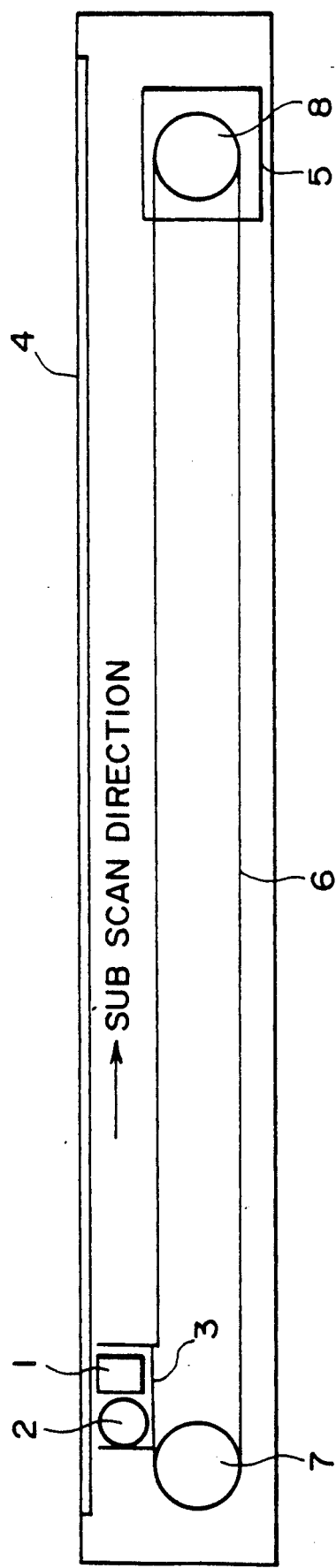
FIG. 2 is a schematic view of the mechanism of said image reading apparatus.

FIG. 2 is a cross-sectional view of a color image reading apparatus embodying the present invention.

A contact-type CCD line image sensor 1 constitutes, together with a light source 2, an integral optical system unit 3, which is rendered movable in the horizontal direction (sub scanning direction) for reading the entire image of an original document placed downwards on an original support glass plate 4.

Said contact-type line image sensor 1 is composed of plural color image sensors of respectively different color outputs which are arranged on a single substrate with a predetermined interval in the sub scanning direction, and is capable of supplying color component image data for example of red (R), green (G) and blue (B).

The optical system 3 is driven in the sub scanning direction by means of a scanning system consisting of a stepping motor 5, pulleys 7, 8 and a driving belt 6.

The change in the image magnification in the sub scanning direction is achieved by a change in the moving speed of the optical system 3 in the sub scanning direction. If the contact CCD line image sensor 1 performs image reading with a constant speed regardless of the image magnification, an image enlargement is achieved by reducing the moving speed from that in the same-size image reading mode, since the amount of image data increases for a given amount of movement. Also an image reduction is achieved by increasing the moving speed from that in the same-size image reading mode, since the amount of image data decreases for a given amount of movement.

On the other hand, the change in the image magnification in the main scanning direction of the contact CCD line image data for image enlargement or image reduction is carried out by repeating the image data for image enlargement and by skipping the image data for image reduction.

Since the change in the image density is basically equivalent to the change in the image magnification, the latter alone will be explained in the following description.

Figure 1:
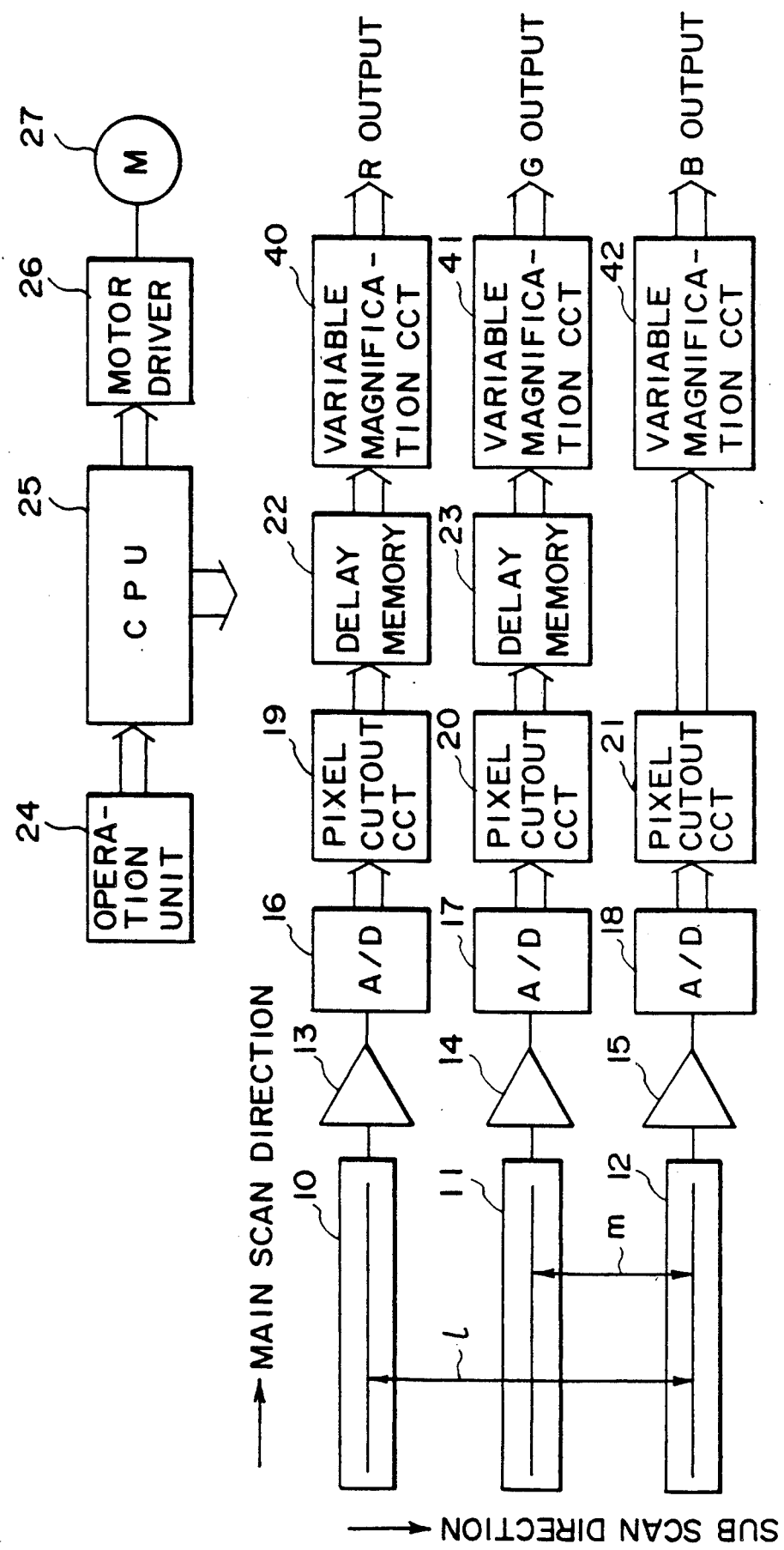
FIG. 1 is a block diagram showing an example of the circuit of the image reading apparatus of the present invention.

FIG. 1 is a block diagram showing an example of a color image reading apparatus embodying the present invention. It is to be noted that the structures irrelevant to the present invention are omitted for the purpose of simplicity.

An operation unit 24 is used, by the operator, for entering various instructions such as the start/stop of the image reading, or various settings such as the image magnification. A CPU 25, composed principally of a known microcomputer, controls the functions of the entire apparatus according to the instructions and settings from said operation unit 24. A stepping motor 27 (corresponding to the stepping motor 5 shown in FIG. 2) is driven by a motor driver 26 controlled by a control signal from the CPU 25. More specifically the CPU 25 rotates the stepping motor 27 with a rotating speed corresponding to the image magnification set by the operation unit 24, thus achieving a change in the image magnification in the sub scanning direction.

Variable magnification circuits 40, 41, 42 repeat or skip the entered image data, according to the image magnification selected by the operation unit 24 and under the control of the CPU 25.

The CPU 25 also controls the on/off state and the amount of light of the light source 2, and the data communication with external apparatus such as a printer or a display unit to be connected to the image reading apparatus.

Line image sensors 10-12, integrally incorporated in the contact CCD line image sensor 1, respectively supply image data of red (R), green (G) and blue (B) components. The line image sensors 10 and 11 are separated by a distance l in the sub scanning direction, while the sensors 10 and 12 are separated by a distance m, and the positional aberrations resulting from said distances are compensated by a data delay circuit utilizing memories corresponding to said distances.

For example, if said distances l and m correspond to 10 and 20 pixels calculated in the recording density in the main scanning direction, there will be required memory capacities of 10 and 20 lines of the main scanning data, for the data delay in the same-size image reading.

If an image enlargement is conducted with an image magnification of 10 times both in the main and sub scanning directions, the aberration in the reading positions among three line image sensors 10-12 is increased 10 times, so that the memory capacity required for compensation in the sub scanning direction also increases 10 times. As an example, if the amount of data of a main scanning line is 5K bytes, there will be required a memory capacity of 500K+1000K=1500K bytes for an image enlargement of 10 times.

However, among the pixels in a main scanning line released from each of the line image sensors 10-12, those actually used are only 1/10 in case of an image magnification of 10 times for example if the number of pixels per line in a printer is constant regardless of the image magnification. Consequently, if the delaying operation in the memory is conducted after the extraction of necessary pixels, there will be required a memory capacity of 1/10 of 1500K bytes, which is equal to the memory capacity in the same-size image reading operation.

Buffer amplifiers 13-15 are provided for amplifying the analog image signals released from the line image sensor 10-12, and the amplified analog image signals are respectively converted into digital image signals by A/D converters 16-18.

Image cutout circuits 19-21 are provided for extracting necessary image data from the image of a line, according to the image magnification. The image data extracted by the image cutout circuits 19, 20 are respectively subjected to delays in delay memories 22, 23, corresponding to the aforementioned distances l, m, and are then released as image data of a same scanning line of the image data from the image cutout circuit 21.

In the present embodiment, the image data from the line image sensors 10, 11 are synchronized with the image data from the line image sensor 12, so that the delay memory for the line image sensor 12 is dispensed with.

However, it is also possible to also delay the image data from the line image sensor 12, and to further delay the image data from other image sensors 10, 11, in consideration of the delay in the image data from said sensor 12. It is furthermore possible to take the image data from the line image sensor 10 or 11 as a reference and to synchronize the image data from other image sensors therewith.

Now reference is made to a timing chart shown in FIG. 3, for explaining the function of the circuit shown in FIG. 1.

FIG. 3 shows the timing in case the amounts of data delay in consideration of the distances l, m and the image magnification are respectively 4.6 lines and 2.3 lines. For the purpose of simplicity, said timing chart illustrates a case of an image enlargement of 230%, wherein the distances l, m respectively correspond to 2 pixels and 1 pixel. It is also assumed that the enlargement is applied to an image at the center of the main scanning area on the original support glass 4.

Within the output signal of each line from the A/D converter 16, a portion corresponding to the cutout area released from the pixel cutout circuit 19 (a high-level portion corresponding to ca. 1/2.3 of the same-size image reading since an image enlargement of 230% is intended) is recorded in the delay memory 22. Similarly the output of the A/D converter 17 is cut out by the cutout circuit 20 and stored in the delay memory 23.

The pixel cutout circuit 21 performs the cutout of an area from the output of the A/D converter 18. In synchronization with the output of said cutout circuit 21, the image data from the delay memories 22, 23 are released with respective delays of distance l×image magnification and distance m×image magnification, namely 4.6 lines and 2.3 lines in the present case, as the R, G, B output signals representing the different color images in a same line.

The above-mentioned delays compensate the positional aberrations between the sensors having distances l, m in the sub scanning direction, so that the succeeding circuits can execute processes, for example a masking process, for the image data obtained by reading a same position of the original at the same time.

The cutout circuits 19, 20, 21 perform the image cutout naturally in a same area. The cutout area of image data varies according to the position of the original image or the trimming area therein. For example, when the original document is placed on the original support glass 4 starting from an end in the main scanning direction, said cutout circuits 19, 20, 21 cut out the image data of a necessary area starting from an end of the output data of each line.

Now reference is made to FIG. 4 for explaining the examples of the cutout circuits 19–21 and delay memories 22, 23 shown in FIG. 1.

Figure 4A:
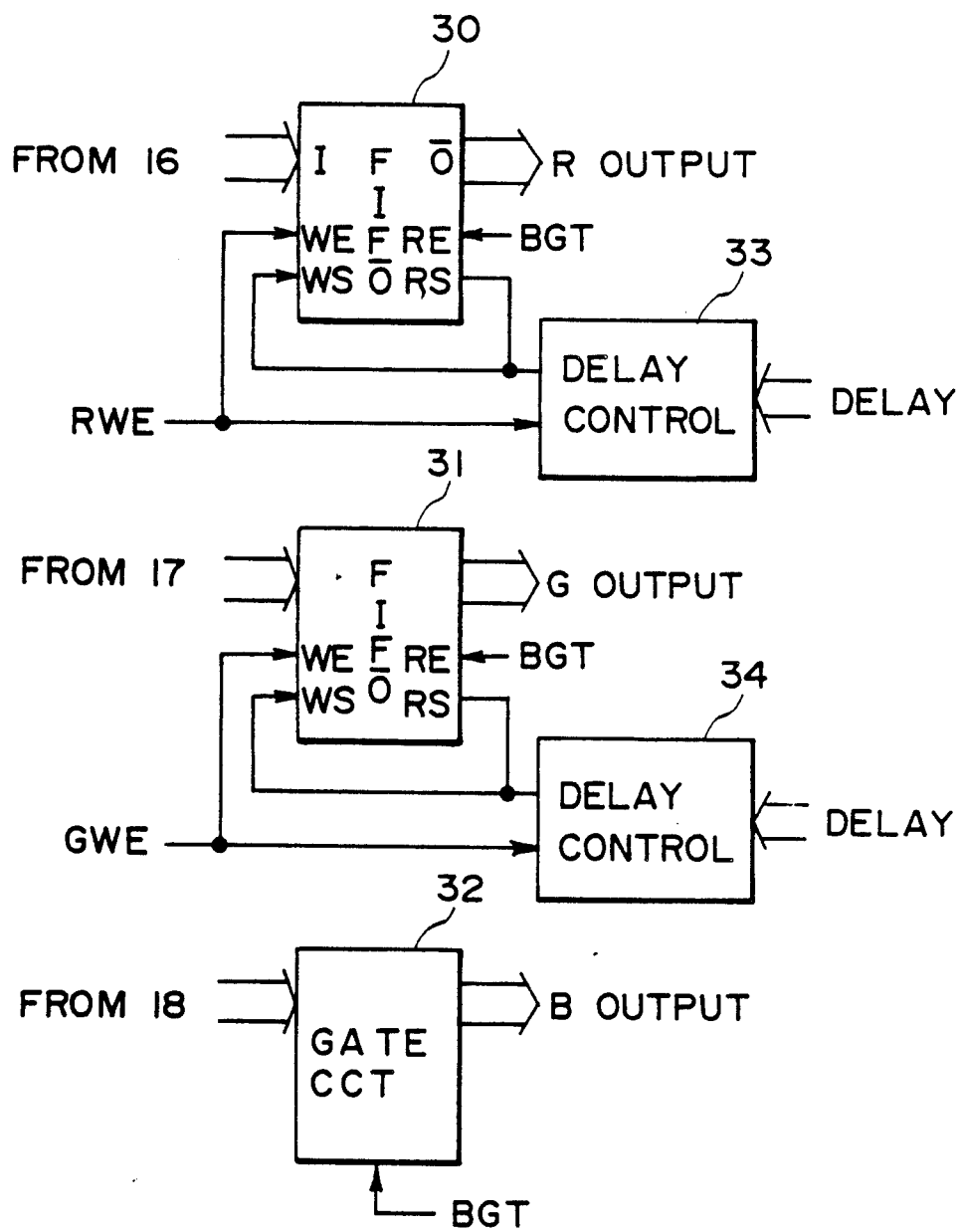
FIGS. 4A and 4B are block diagrams showing examples of pixel cutout circuits 19-21 and delay memories 22, 23 shown in FIG. 1.

In FIG. 4A, first-in-first-out (FIFO) memories 30, 31 correspond to the delay memories 22, 23. Also circuits 32–34 correspond to the pixel cutout circuits 19–21.

Figure 4B:
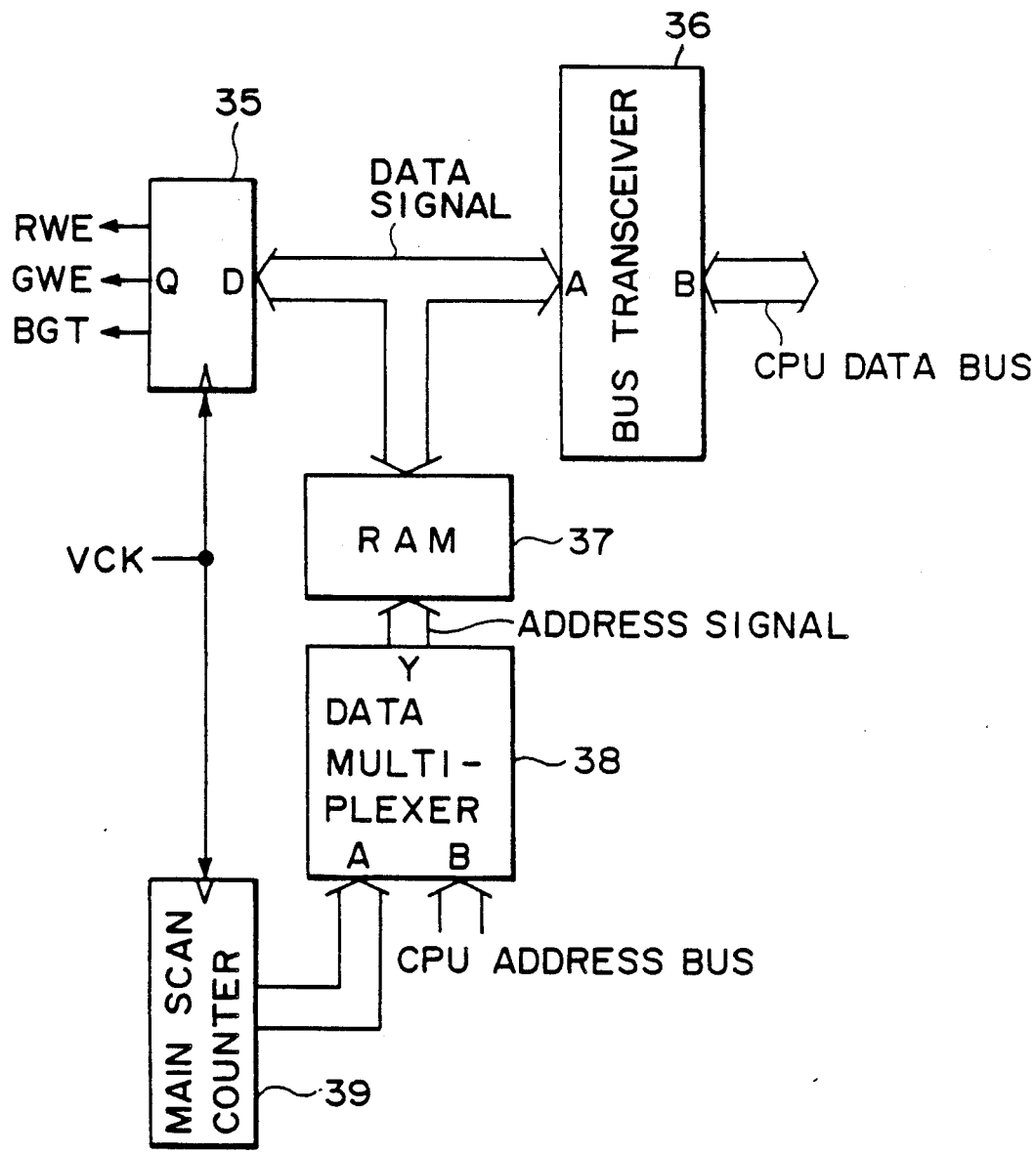

In FIG. 4B, circuits 35–39 release output signals for defining the cutout area. More specifically there are released signals RWE, GWE and BGT for use in the pixel cutout circuits 19–21 shown in FIG. 3.

A central processing unit (CPU) 25 determines the timing of the generation of the signals RWE, GWE and BGT according to the image magnification and the editing instruction. Data corresponding to the thus determined timing are stored in a random access memory (RAM) 37 through a bus transceiver 36 and a data multiplexer 38. Then the data are read in succession from the RAM 37 according to the count of a main scanning counter 39 to obtain the signals RWE, GWE and BGT at predetermined timings through a latch 35.

Said main scanning counter 39 counts pixel clock pulses VKC in a main scanning line in synchronization, for example, with the line image sensor 12. If said main scanning counter 39 is composed of an up counter, it counts upwards the pixel clock pulses VCK from an initial value, in synchronization with the start of charge accumulation or image transfer of the line image sensor 12, and repeats this operation for every main scanning operation. In such case, therefore, the data can be stored in the RAM 37 in such a manner that the signals RWE, GWE and BGT are generated in response to the function of the line image sensor 12. In this manner the signals RWE, GWE and BGT indicating the cutout area are released for each line.

The FIFO memory 30 stores data corresponding to the high-level state of the signal RWE, and the data thus stored are read in synchronization with the signal BGT, after a delay which is set in advance in the delay control circuit 33 by the CPU 25 according to the image magnification. Said delay control circuit 33 releases reset signals for the writing and reading operation of the FIFO memory 30 according to the amount of delay. A FIFO memory 31 performs a similar function on the signal GWE, in cooperation with a delay control circuit 34.

In this manner the necessary image data corresponding to the image magnification are cut out in response to the signals RWE, GWE and stored in the FIFO memories 30, 31 for compensating the aberration resulting from the difference in the reading positions of the line image sensors 10–12.

A gate circuit 32, composed for example of a logic sum gate, is provided for releasing the data only in the effective period of the signal BGT. A gate circuit 32 may be dispensed with if the presence of unnecessary image data does not bother the succeeding circuits.

Now reference is made to FIG. 5 showing a simplified control flow chart of the CPU 25 in case the present apparatus is used as an image reading unit for a color copying machine.

After the start of power supply, a step SP1 initializes the apparatus, and a step SP2 awaits the entry of a copy start instruction from the operation unit 24.

A step SP3 calculates the data to be stored in the RAM 37 and the delay to be set in the delay control circuits 33, 34 from the image magnification and the image editing information entered from the operation unit 24, and sets the thus calculated values.

Then a step SP4 initiates the original reading operation, and a step SP5 awaits the completion of said original reading operation. After the completion of said operation, the sequence returns to the step SP2 for repeating the above-described operations.

In this manner the present embodiment achieves the aforementioned operations by the data stored in the RAM 37 and the delays stored in the delay control circuits 33, 34.

In the foregoing there has been explained the reduction of the quantity of the stored image data in case of image enlargement. However, in case of image reduction, if the magnification change (data skipping) is to be conducted after the compensation of aberration in the image reading positions, the entire data of a line are stored in the FIFO memories 30, 31.

It is already known to reduce the charge accumulating time of the image sensor, in order to improve the resolving power in the image reading. As an example, if two scannings are conducted within the period of one main scanning line (image reading with doubled density), the amount of movement in the sub scanning direction during the charge accumulation is halved, whereby the read area in the sub scanning direction is decreased and the resolving power is improved.

In such image reading with doubled density, there are only required data of every other line. Therefore, in the application of the present invention, the memory capacity of the delay memories can be reduced by defining the image cutout areas in every other line as shown in FIG. 6.

On the other hand, the image reduction is usually conducted by the skipping of the image data. In such case, therefore, it is also possible to reduce the capacity of the delay memories, at the storage of the image data of a line into the delay memory, by generating the signals defining the cutout area in an intermittent manner according to the rate of image reduction, as shown in FIG. 7, thereby effecting the reduction of image data at the image cutout operation.

In the foregoing description the image magnification in the main scanning direction is assumed, to be equal to that in the sub scanning direction, but the present invention is applicable even if the image magnification is different in two directions.

In such case, a difficulty is encountered if the image magnification is unity in the main scanning direction while the image is enlarged in the sub scanning direction, because the number of pixels required in a main scanning line does not decrease while the number of lines in the sub scanning direction increases, so that the required capacity of the delay memory increases in both directions, in comparison with the case of same-size image reading.

Such difficulty can however be resolved by changing the direction of the original document from a state shown in FIG. 8A to a state shown in FIG. 8B, or by interchanging the directions of main scanning and sub scanning. In the above-mentioned example, the image is enlarged in the main scanning direction and is of the same size in the sub scanning direction for obtaining the same result, so that the required capacity of the delay memory decreases both in the main and sub scanning directions, in comparison with the case of same-size image reading.

Thus, if the image magnification is independently variable in the main and sub scanning directions, it is possible to reduce the required capacity of the delay memory, in comparison with the case of same-size image reading in the main and sub scanning directions, by selecting a condition:

$$\text{image magnification in the main scanning direction} \geq \text{image magnification in the sub scanning direction.}$$

In the application of the present invention, therefore, there may be employed a method of prohibiting the selection of image magnifications not satisfying the above-mentioned relation, or, if such selection is made, releasing a message to request replacement of the original document as shown in FIG. 8.

Moreover, if the selection of image magnifications not satisfying the above-mentioned relation is frequently anticipated, it is also possible to give a certain marginal capacity in the delay memory and to apply the above-mentioned prohibition or alarm message only in an exceptional case:

$$\text{image magnification in the main scanning direction} - \text{image magnification in the sub scanning direction} > \text{a predetermined constant } \alpha.$$

In the foregoing embodiment, the line image sensor releasing the R signal reads the image at first, and is followed by other line image sensors for the G and B signals, but the arrangement of three line image sensors is not limited by such an embodiment. Also the distances of the line image sensors are not limited to those described in the foregoing embodiment.

Also the structure of the image reading apparatus is not limited to that shown in FIG. 2. For example there may be employed line image sensors shorter than the width of the original to be read, wherein the image of the original is formed on said sensors through a reduction optical system. Also there may be employed a structure in which the image sensors are fixed while the original is moved relative thereto.

Also, instead of three-color separation into red, green and blue, there may be employed two-color separation with two line image sensors, or color separation with plural line image sensors equipped with filters of other colors.

As already explained in the foregoing, the change in image magnification is basically equivalent to the change in image reading density. Therefore, a density conversion with a reduced memory capacity for the image data is possible by a similar operation with a designated density instead of a designated image magnification.

As explained in the foregoing, it is rendered possible to reduce the cost of the delay means and the cost of the entire circuit through the use of a simple circuit structure, since there is only required delay means of a fixed capacity regardless of the image magnification or the image reading pixel density.

Though the present invention has been explained by a preferred embodiment thereof, it is not limited to such embodiment and is subjected to various modifications and variations within the scope and spirit of the appended claims.

What is claimed is:

1. An image reading apparatus comprising:
   plural line sensors each comprising a plurality of photosensitive elements, said line sensors being arranged such that lines read at a given instant by said plurality of line sensors mutually differ;
   moving means for causing relative movement of said plurality of line sensors and an original image in a direction perpendicular to a scanning direction of said line sensors at a speed corresponding to a reading magnification or a reading density of the original image;
   extracting means for cutting out image data from image data output from at least one of said line sensors;
   delay means for delaying by a delay time the image data cut out by said extracting means, the delay time being varied in accordance with the reading magnification or the reading density of the original image; and
   varying means for varying an amount of image data to be extracted by said extracting means in accordance with the reading magnification or the reading density of the original image.

2. An image reading apparatus according to claim 1, wherein said line sensors are equipped with respectively different color filters.

3. An image reading apparatus according to claim 1, wherein said delay means comprises memory means capable of storing the extracted image data and outputting the same after a delay.

4. An image reading apparatus according to claim 1, further comprising means for repeating or skipping the delayed image data in accordance with the reading magnification or the reading density of the original image.

5. A color image reading apparatus comprising:
   a plurality of line sensors each comprising a plurality of photosensitive elements, said line sensors being arranged to cause lines read at a given instant by said plurality of line sensors to mutually differ, each of said line sensors generating an associated one of a plurality of color component data;
   moving means for causing relative movement of said plurality of line sensors and a color original image in a direction perpendicular to a scanning direction of said line sensors at a speed corresponding to a reading magnification or a reading density of the color original image;

extracting means for cutting out color component data from color component data output from at least one of said line sensors;

delay means for delaying by a delay the time color component data cut out by said extracting means, the delay time being varied in accordance with the reading magnification or the reading density of the color original image; and varying means for varying an amount of color component data to be extracted by said extracting means in accordance with the reading magnification or the reading density of the color original image.

6. A color image reading apparatus according to claim 5, wherein said line sensors are equipped with respectively different color filters.

7. A color image reading apparatus according to claim 5, wherein said delay means comprises memory means capable of storing the extracted color component data and outputting the same after a delay.

8. A color image reading apparatus according to claim 5, further comprising means for repeating or skipping the delayed color component data in accordance with the reading magnification or the reading density of the color original image.

* * * * *

UNITED STATES PATENT AND TRADEMARK OFFICE
CERTIFICATE OF CORRECTION

PATENT NO. : 4,999,717
DATED : March 12, 1991
INVENTOR(S) : Nao Nagashima It is certified that error appears in the above-identified patent and that said Letters Patent is hereby corrected as shown below:

COLUMN 1:

Line 60, "Consequently" should read --Consequently,--.
   Line 60, "capacity," should read --capacity--.
   Line 64, "same size" should read --same-size--.

COLUMN 6:

Line 68, "assumed," should read --assumed--.

COLUMN 7:

Line 48, "direction >" should read --direction $\geq$--.
   Line 58, "Also" should read --Also,--.
   Line 63, "Also" should read --Also,--.

Signed and Sealed this

Twenty-ninth Day of December, 1992

Attest:

DOUGLAS B. COMER

*Attesting Officer*     *Acting Commissioner of Patents and Trademarks*